May 2, 1967 P. WENIG 3,316,813
APPARATUS FOR CHAIN BROACHING MACHINES
Filed Sept. 7, 1965
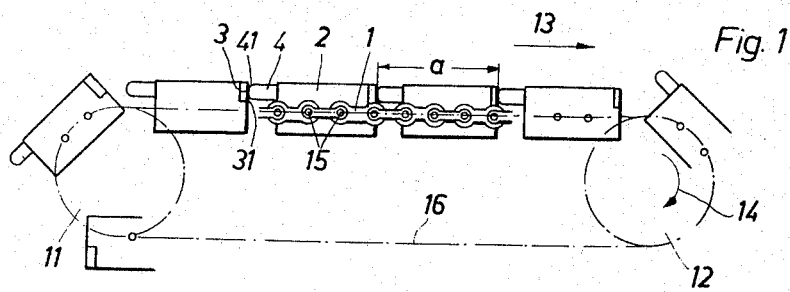
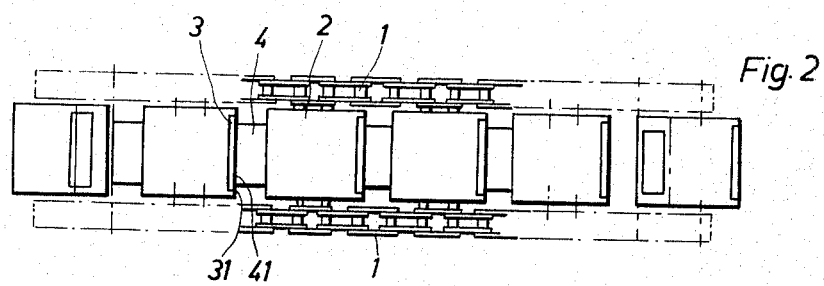
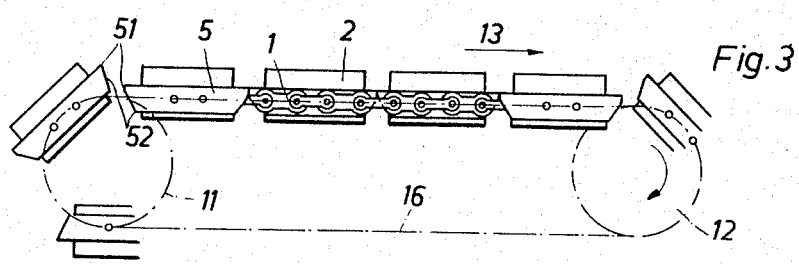
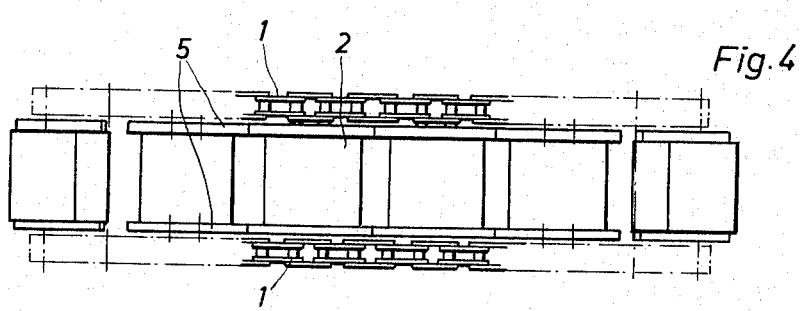

3,316,813
APPARATUS FOR CHAIN BROACHING MACHINES
Paul Wenig, Pforzheim, Germany, assignor to Karl Klink, Werkzeug und Maschinenfabrik, a company of Germany
Filed Sept. 7, 1965, Ser. No. 485,463
Claims priority, application Germany, Sept. 8, 1964, K 53,952
11 Claims. (Cl. 90—78)

The invention concerns apparatus for chain broaching machines with at least one drive chain conveyed between two guide wheels, on the members or links of which there are disposed apparatus supports in sequence in the direction of movement of the chain, said apparatus supports being conveyed in a lineal guide in the region of engagement between tool and workpiece.

In comparison with broaching machines where the broaching tool is conveyed to and fro, chain broaching machines have the advantage of a shorter constructional length and continuous operation. Here, the tool is throughout disposed fixedly on the machine and the workpieces in each case are arranged on separate apparatus supports which are fixed one behind the other on one or a plurality of circulating chains. In principle also the reverse method can be selected, i.e. with the tool disposed on the apparatus support and the workpiece fixedly disposed on the machine. This method can in fact be necessary, when four example as a special case an excessively long broaching tool is required, as this can then be carried out with double the length possible with an ordinary broaching machine. As a rule, however, the workpiece is set in a holding device disposed on the apparatus support, and after the completion of the working but before the completion of a full revolution, is automatically released from the said holding device and dropped off. As, however, the chain of itself can offer no adequately accurate guiding, in the region of the tool lineal guide paths are provided, into which the apparatus supports are inserted before the beginning of the working and from which they are again brought out after the freeing of the workpiece from the tool. In order to make the said putting in and bringing out possible, the lineal stringer of the drive chain and the axial distance between the two guide chain wheels must be constructed somewhat larger than the engagement-length on the tool.

With the known chain broaching machines of this type the apparatus supports are connected exclusively by the chain links lying between. The method of working of the present invention means that the workpieces come into and out of engagement one after the other with the various cutting or shaving faces of the broaching tool. As a result of this there is at continuous and in fact jerky alternation of the cutting forces acting on the single workpiece, and accordingly also on the appertinent apparatus support, the effect of which is particularly disadvantageous when comparatively short workpieces have to be worked, on which throughout at any time only one or two cutting edges engage. The resultant blows have to be taken up on the one hand by the guide and on the other hand by the chain. As, however, the chain links always have a certain degree of elasticity, they extend more or less strongly under the effect of the tractive and retaining forces exerted on them, and this leads to reciprocal movements of varying size between the adjacent apparatus support at the beginning and at the end of each single cutting process. Accordingly, chatter vibrations occur and the tool, the workpiece and also the chain, as well as the holding devices for the workpiece, are subjected to highly undesirable stresses. The edge life of the tool is reduced, the quality of the worked surface is impaired, the guide play is increased as time goes on, and also the remaining parts subjected to the chatter vibrations are subjected to comparatively heavy wear.

The task of the invention is accordingly to overcome substantially the disadvantages of the known apparatus, in particular the chatter vibrations occurring therewith and their consequences for chain broaching machines.

The invention overcomes these disadvantages first and foremost by arranging support surfaces at the rear and at the front end of the apparatus supports, which with extended chain, inside the lineal guide region and with pre-tensioning of the chain, come to abut against each other. The distance between the said support surfaces can be such, in relation to the distance between adjacent apparatus supports on the unbraced chain, that on the bringing into engagement of the support surfaces on entry into the lineal guide the drive chain is pre-tensioned in such a way that the pre-tensioning force is at least as great as the maximum chain bracing to be transmitted in the broaching operation between adjacent apparatus supports. The chain with the apparatus supports forms inside the lineal guide a rigid whole. Although it is possible for force vibrations to occur in the single chain links, the said vibrations alter only the inner forces of the parts rigidly connected together, without being able to call forth a reciprocal movement between adjacent apparatus supports. As a result of this, however, chatter vibrations are substantially obviated, and as a result there is an even, quiet run of the whole drive chain unit. The edge life of the tool is prolonged to an extraordinary degree, the finished quality is increased, and the life of the whole machine plant is considerably increased.

In a preferred embodiment of the invention at least one of the cooperating support surfaces is disposed on a special, preferably hardened constructional element. Such a constructional element receiving a support surface can be arranged adjustably in the longitudinal direction of the chain on its apparatus support.

In principle the cooperating support surfaces can be constructed flat, if care is taken by arranging a corresponding kinematic guide that on the coming into and out of engagement they move substantially perpendicular to each other. For the most part it is however suitable to construct at least one of the cooperating surfaces domed. For example at one end of the apparatus support there can be disposed a cross-bar with substantially flat support surface, and at the other end a projection with domed support surface projecting to the adjacent tool support.

As the tool engagement as a rule lies outside the chain loop, as far as possible also the support surfaces should be disposed outside the mid-chain loop between this and the tool-engagement. A further increase in quietness of running is obtained if one provides in each case a pair of support surfaces laterally outside on the apparatus supports. For example one can arrange continuous support strips laterally outside on the apparatus supports, preferably between the latter and two lateral drive chains. The said strips can be constituent parts of the apparatus support, or, as is finally further proposed, they can be constructed as chain links holding the apparatus supports.

The invention will now be described with reference to the accompanying drawings, which show two preferred embodiments of the invention, but in no restrictive sense.

FIGURE 1 shows diagrammatically a side view of a chain apparatus of the invention for a chain broaching machine.

FIGURE 2 is a view from above onto the said apparatus shown in FIGURE 1.

FIGURE 4 is a view of the apparatus shown in FIGURE 3, viewed from above.

In FIGURES 1 and 2, 1 designates two lateral drive chains, which circulate in the direction of the arrow 13 between two guide wheels 11, 12 in the way known per se and accordingly not further represented. As the arrow 14 indicates, the guide wheel 12 is driven. Apparatus supports 2, i.e. workpiece or tool supports, in any desired number are fixed between the two drive chains by means of in each case two chain bearings 15 to which apparatus supports can be connected in the way known per se by means of special holding devices, the separately to be worked workpieces. The chains can be arranged with horizontal, but in principle also with perpendicular chain loops 16. In the vicinity of the tool, that is not shown, and which in FIGURE 1 can be assumed to be lying above, the apparatus supports 2, also in the known way, are guided in a rigid lineal guide. The tool arrangement takes place here outside the ground plan of the whole chain arrangement. Between this region of the workpiece engagement and the mid chain loop 16 there are arranged behind each workpiece support a crossbar 3 with a support surface 31 and in front a plate-like projection 4 with a domed support surface 41. The parts 3 and 4 consist of hardened steel and have ground support surfaces. The assembled parts 2, 3 and 4 can be regarded as a unit rigid in itself but slightly deformable by the forces arising. One of the two parts 3 or 4 can be disposed adjustably on the workpiece support 2 for adjustment of the total length. This can for example be done by backing the support strips 3 with small gauging sheets of varying thickness. The length *a* corresponds for example substantially to the here for example fourfold length of a chain link, but is so selected, taking into account the maximum stress occurring on the broaching operation, including the thrust forces which arise, that the four chain links lying are behind the other never achieve a greater total length than *a* with unbraced chain accordingly adjacent apparatus supports in each case have a small angle in relation to each other, and this cannot have disadvantageous results even in the vicinity of the chain stringer running back. However, as soon as the apparatus supports run form-determinedly into the rigid lineal guide, they are extended in relation to each other in such a way that the chain links in the whole guide region are subjected to at least the maximum chain tensioning to be expected.

The apparatus supports braced against each other in this way form with the chain inside the lineal guide, a practically rigid rod which can be guided with the utmost precision and the relative position of which is not influenced by the coming into and out of engagement at the separate cutting edges of the tool, as only the inner forces alter, i.e. the tractive force in the individual chain links between adjacent apparatus supports suffers vibrations which also occur between the adjacent support faces without thereby the bearing forces on the support surfaces at any time going below the zero value, i.e. the apparatus supports, during each momentary cutting state as it arises, remain braced and carry out practically no reciprocal movements.

The embodiments shown in FIGURES 3 and 4 differ from that described above in that in place of the parts 3 and 4 laterally on the apparatus supports between these and the two outside-lying drive chains 1, support strips 5 are disposed, at the front and rear ends of which disposed above and outside the chain loop 16, there are relatively narrow support surfaces 51, from which the remaining front positioned surface parts 52 run back inwardly. In principle it is also possible to carry out the strips 5 as chain links disposed fixedly on the drive chain. The remaining parts of FIGURES 3 and 4 correspond to those of FIGURE 1 and 2 and are provided with the same reference numbers.

Both embodiments have in common that they at least to a substantial extent reduce the chatter vibrations occurring with the known devices and their consequences, by the improved and substantially rigid cutting power with independent guiding of the workpieces. The embodiments shown can, however, be altered in many aspects. Instead of a single projection 4 as in FIGURES 1 and 2, two such outside-lying projections can be arranged. One can construct the apparatus supports themselves as chain links, and additionally, support surfaces joining these chain links. Furthermore the abutting can be carried out by special positively adjustable devices. For example, a wedge device or another chain element can be used, that between adjacent apparatus supports is to be brought into and out of engagement. This can take place before the beginning and on the completion of the broaching process by control surfaces of impact effect. In particular, the part 3 in FIGURE 1 can be replaced by a clamp element in the form of a wedge which on the bracing is pushed in and on the release of tension returns to its position.

I claim:

1. In an apparatus for chain broaching machines with at least one drive chain guided between wheels, on the members or links of which are disposed in sequence in the direction of movement of the chain apparatus supports which in the region of the engagement between tool and workpiece are guided in a lineal guide, the improvement consisting in support surfaces provided at the rear and front and of the apparatus supports which when the chain is extended, come to rest against each other within the lineal guide region with pretensioning of the chain.

2. In an apparatus as claimed in claim 1, the improvement consisting in that at least one of the cooperating support surfaces is disposed on a special, preferably hardened constructional element.

3. In an apparatus as claimed in claim 1, the improvement consisting in that a constructional element receiving a support surface is disposed on its apparatus support adjustably in the longitudinal direction of the chain.

4. In an apparatus as claimed in claim 1, the improvement consisting in that at least one of the cooperating surfaces is of domed construction.

5. In an apparatus as claimed in claim 1, the improvement consisting in that the support surfaces lie outside the mid chain loop between the latter and the tool engagement.

6. In an apparatus as claimed in claim 1, the improvement consisting in that a cross bar is disposed on one end of the apparatus support, said cross bar having a substantially flat support surface and projection is disposed at the other end of the apparatus support said projection having a domed support surface, projecting towards the adjacent apparatus support.

7. In an apparatus as claimed in claim 1, the improvement consisting in that in each case a couple of support surfaces are provided laterally outside on the apparatus supports.

8. In an apparatus as claimed in claim 1, the improvement consisting in support strips disposed outside on the apparatus supports, in particular between the latter and two lateral drive chains.

9. In an apparatus as claimed in claim 1, the improvement consisting in that the support surfaces are constructed as the chain links holding the apparatus supports.

10. In an apparatus as claimed in claim 1, the improvement consisting in clamp elements, disposed between adjacent apparatus supports, and to be brought in and out of operating position, which preferably are controllable by controlled surfaces or members disposed in their path of movement in front of and behind the engagement stretch.

11. In an apparatus as claimed in claim 10, the improvement consisting in that the clamp elements are wedge-shaped.

References Cited by the Examiner

UNITED STATES PATENTS

| | | | |
|---|---|---|---|
| 2,288,611 | 7/1942 | De Wyk | 198—195 |
| 2,525,949 | 10/1950 | Sabre | 90—78 |

WILLIAM W. DYER, Jr., *Primary Examiner.*

G. A. DOST, *Assistant Examiner.*